March 26, 1957  R. M. WARNER  2,786,978
APPARATUS FOR MEASURING SURFACE SPEED
Filed June 16, 1953
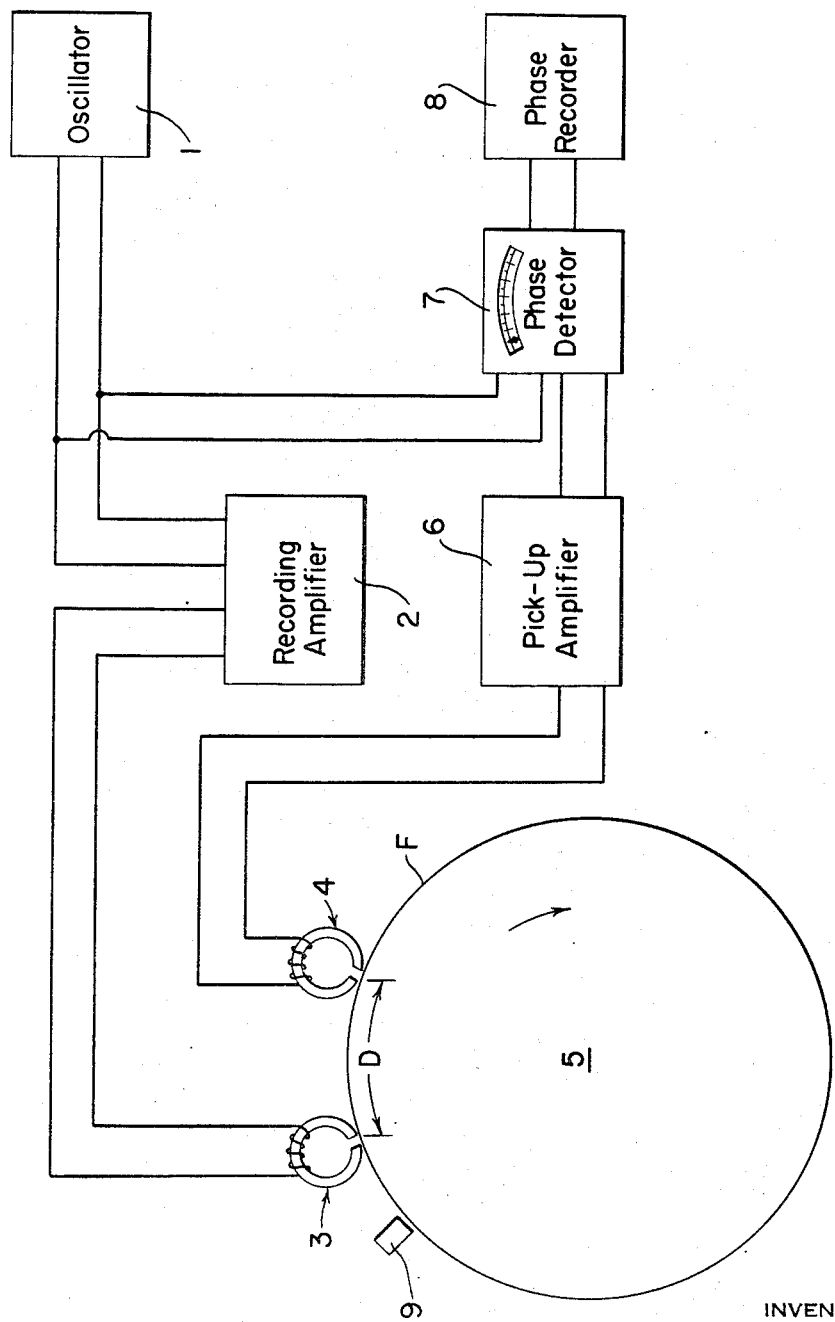
INVENTOR
Roger M. Warner
BY
ATTORNEYS

United States Patent Office 2,786,978
Patented Mar. 26, 1957

2,786,978

APPARATUS FOR MEASURING SURFACE SPEED

Roger M. Warner, Hamilton, Ohio, assignor to The Champion Paper and Fibre Company, Hamilton, Ohio, a corporation of Ohio Application June 16, 1953, Serial No. 362,078

8 Claims. (Cl. 324—70)

This invention relates to a method and apparatus for measuring the surface speed variations in the surface speed of moving magnetic material, and more particularly to a method and apparatus for measuring the surface speed of iron or steel rolls.

Although the present invention is broadly applicable for measuring the surface speed of any object formed of magnetic material, or for measuring variations in the surface speed of one or a plurality of such objects, it is particularly applicable for measuring the speed, or variation in the speed, of iron or steel rolls such as those used in paper machine driers.

In the production of paper, it is necessary to pass the wet paper webs through a drier to remove water therefrom. Such driers are conventionally composed of a series of heated rotating iron or steel drums or rolls over which the paper web passes in a serpentine path. In the drying operation, it is of the utmost importance that the rolls travel at controlled and predetermined speeds. If the speed of one of the rolls in the drier varies even slightly from that desired, the paper sheet being processed is subjected to an additional strain which causes a stretching or breaking of the paper. It is thus important that there be provided means to accurately measure and indicate the surface speed of the rolls, so that any deviation of such surface speed from that desired can be readily detected and corrected.

The present invention provides an accurate method of measuring the surface speed of moving magnetic objects such as iron or steel rolls. More particularly, the improved method includes magnetically recording a periodically varying signal of constant frequency on the surface of the moving magnetic object, then picking up the recorded signal at a fixed point beyond that at which the signal was recorded in the direction of movement of the object, and measuring the difference in phase between the signal so picked up and the signal being recorded. This method provides the basis for the novel type of surface speed measurement which will very accurately measure changes in surface speed.

For a more detailed description of my invention, reference may be had to the accompanying drawing in which there is diagrammatically illustrated a phase shift surface speed indicator and recorder embodying the present invention and capable of carrying out the improved method.

An oscillator is shown illustrated at 1 and is a known device for producing an alternating or otherwise varying electric current or signal, the frequency of which may be held constant or adjusted to different values. This signal is amplified by a conventional recording amplifier 2 and then employed to energize a magnetic recorder head 3 which records the constant frequency signal in the form of a magnetic pattern on the surface of a moving ferromagnetic object 5 shown in the drawing as the cylinder face F of a roll for purposes of illustration. At a fixed and predetermined distance D beyond the recorder head 3 in the direction of travel of the roll face F and located in the path of travel of the recorded signal, is a magnetic pick-up head 4 of known construction. The pick-up head picks up the recorded signal and transmits it to a pick-up amplifier 6 and then to a phase detector 7. By a direct connection with the oscillator 1, the signal produced by the oscillator is also transmitted to the phase detector 7. The phase detector is a known device, similar to a power factor meter, for measuring the difference in the phase angle $\theta$ between the signal picked up by the pick-up head 3 and the signal produced by the oscillator 1. This difference in phase between the two signals may be recorded by a phase recorder 8. A permanent magnet 9 erases the recorded signal from the roll face F at the end of each revolution of the roll 5.

When a constant frequency signal is recorded on the surface of the moving object, the wave length of the recorded signal in inches will be equal to the surface speed, in inches per second, divided by the frequency in cycles per second. As long as the signal frequency is held constant, the wave length of the signal recorded on the surface is proportional to the surface speed. Since the pick-up head 4 is located a fixed distance D from the recorder head 3 in the direction of movement of the roll face F, the number of cycles recorded on the surface between the recorder head and the pick-up head is equal to the distance D divided by the wave length. The number of cycles recorded in the fixed distance D is thus equal to the product of the distance D and the recorded frequency divided by the surface speed of the object. Therefore, if the frequency and the distance D between the recorder and pick-up heads are fixed, the number of cycles recorded on the surface is inversely proportional to the surface speed. If the surface speed is constant, the number of cycles recorded in the distance D is constant, and the phase angle $\theta$ between the signal recorded on the surface and the signal picked up from the surface will be constant and will remain constant so long as the surface speed is constant. But, if the surface speed of the moving object should change, the number of cycles recorded in the distance D will change and the phase angle $\theta$ will also change. This change in the phase angle will be a measure of the change in the surface speed.

The phase detector and recorder, instead of merely indicating the phase angle between the recorded and picked up signals, may also be calibrated to directly indicate surface speed. This may be done by operating the roll face F at a succession of different surface speeds and directly calibrating the scales of the phase detector and recorder to read in surface speeds. The phase angle instruments may be more conveniently calibrated for direct speed readings of the roll face speed by varying the frequency of the recorded signal while operating the roll face at a constant known speed. The basis for this method of calibration will now be explained.

If the oscillator is adjusted to generate a given frequency $f_1$, and the roll face F is moving at a known speed $S_1$, then the number of cycles $N_1$ recorded on the roll face F between the recorder and pick-up heads 3 and 4 can be expressed as follows:

$$(1) \qquad N_1 = \frac{D f_1}{S_1}$$

and the instruments 7 and 8 will indicate a given angle $\theta$ of phase displacement between the recorded and pick-up signals. If the oscillator frequency is increased to a higher value without change in the roll face speed, the number of cycles so recorded will be increased to a new value $N_2$ which may be expressed as follows:

$$(2) \qquad N_2 = \frac{D f_2}{S_1}$$

and the instruments 7 and 8 will indicate a different angle $\theta_2$ of phase displacement between the recorded and pick-up signals. This same indicated angle $\theta_2$ of phase displacement could also be produced by maintaining the oscillator frequency constant at the original value $f_1$ and changing the surface speed of the roll face F to a new value $S_2$, in which case the number of cycles recorded between the heads 3 and 4 may be expressed as follows:

(3) $$N_2 = \frac{Df_1}{S_2}$$

Equating the two expressions for $N_2$, the relation between the two speed and frequencies becomes:

(4) $$\frac{S_1}{S_2} = \frac{f_2}{f_1}$$

With the relation expressed in Equation 4 above established, the phase angle instruments 7 and 8 are readily calibrated to read directly in surface speed merely by operating the roll face F at one known speed $S_1$ and the oscillator at one known frequency $f_1$, calibrating the instrument and scales for this speed and then adjusting the oscillator frequency to produce other instrument indications and calculating the speeds represented by these indications from the adjusted frequency by means of the Equation 4 above. Thus, for example, if the roll face speed is, say 780 feet per minute and the initial oscillator frequency is 400 cycles per second, for the second calibration point the oscillator frequency is changed to 390 cycles per second, then the second instrument indication will represent a speed of 800 feet per minute when the frequency is restored to 400 cycles per second.

In elements such as rolls and drums which contact the paper web in paper making and processing machines, it is the surface speed rather than the rotational speed, and the relative surface speeds of adjacent elements and the constancy of these speeds, rather than the absolute values of the surface speeds which determine the effect upon the paper, and which are therefore of interest to the operator. In the past, however, surface speeds of cylindrical elements and particularly more or less rapid variations and fluctuations in such surface speeds, have not, so far as I am aware, been susceptible of direct measurement. Determination of surface speeds by translation from rotational speeds, on the other hand, requires knowledge of the exact diameter of each cylindrical element and, even with this knowledge, it is still impossible, by that method, to detect fluctuations in surface speed such as those due to eccentricity of an element. Further, regrinding any cylindrical element, or substituting another which cannot be expected to have exactly the same diameter as the one replaced, alters the relative diameters and relative surface speeds of successive elements while their relative rotational speeds remain the same.

The present invention provides a method and apparatus for directly measuring the surface speeds of cylindrical elements and any fluctuations or variations therein, and for continuously indicating and autographically recording the results of the measurements. By calibrating the instrument, as described, with a surface moving at an accurately known speed, it is possible, if desired, to use the instrument for the accurate measurement of absolute values of surface speed. However, as above noted, such accurate measurement of absolute speeds is not ordinarily desired, the accuracy of conventional tachometers being normally all that is necessary for this purpose. Such tachometers, however, do not detect fluctuations and variations in surface, or rotational speed that may be vitally important. If calibration is made with a surface moving at only an approximately known speed, the speed fluctuations themselves will be measured with an equal degree of approximation. In other words, if the speed used in calibration is in error by 1 percent, the readings of speed variations will be in error by only 1 percent of the variation, not by 1 percent of the actual speed, as they would be if determined by substraction of tachometer readings. That is, at the 800 feet per minute speed used in the example of calibration, a speed variation of 2 feet per minute would be indicated by the method and apparatus of the present invention with an error of only 0.02 feet (less than ¼ inch) per minute.

The range of measurement by an instrument according to the invention will be the equivalent, at the speed and frequency used, of the phase difference measurable by the phase detector. It will also be understood that narrowing this range makes possible the measurement of smaller differences, and vice versa. Other factors being equal, increasing the frequency of operation makes possible closer measurements over a narrower range, while decreasing the frequency has the opposite effect. It is therefore possible, by using an oscillator of adjustable frequency, to adjust the range and sensitivity as desired.

The various components which make up the combination may all be of standard commercial make. The oscillator used may be a commercial vacuum tube oscillator, though a tuning fork oscillator may be used where greater accuracy is desired. The recording and pick-up heads are standard parts such as are used for these purposes in commercial tape recorders. The amplifier and phase detector may also be standard commercial products. Phase detectors, as made, differ in the maximum phase difference they are adapted to measure, and one should be selected with due regard to the range and sensitivity of the speed measurements to be made. The phase recorder may be a commercial recording milliameter which records the current output generated by the phase detector as a measure of the phase difference.

Although only one embodiment of the present invention has been described, modification may, of course, be made without departing from the scope or spirit of the present invention as defined in the appended claims.

It will also be understood that the terms "measuring" and "recording" employed in the appended claims are not to be narrowly construed as indicating or recording actual speed in numerical values, but also includes apparatus for indicating and recording changes in speed of a single moving element as well as relative speeds of two or more moving elements.

I claim:

1. Apparatus for measuring the surface speed of a moving object which comprises a recording head for recording a varying signal of constant frequency on the surface of the object, a pick-up head located at a fixed point spaced from the recording head to pick up the recorded signal and means for measuring the difference in phase between the variations of the signal picked up by the pick-up head and the signal recorded.

2. Apparatus for measuring the surface speed of a moving object of magnetic material which comprises a magnetic recorder head for recording a periodically varying magnetic signal of constant frequency on the object, means for energizing the recording head with a periodically varying signal of constant frequency, a magnetic pick-up head located at a fixed and predetermined point spaced from the point of recording to pick up the recorded signal, and a phase detector for measuring the difference in phase between the variations of the signal picked up by the pick-up head and the signal supplied to the recording head.

3. The apparatus of claim 2 which additionally comprises a phase recorder for recording the difference in phase measured by the phase detector.

4. Apparatus for measuring the surface speed of rotating rolls of magnetic material which comprises a magnetic recorder head for recording a periodically varying signal on the surface of the rolls, means for energizing the recording head with a periodically varying signal, a magnetic pick-up head located at a fixed point spaced from the recording head in the path of travel of the recorded signal to pick up the recorded signal from the surface of the rolls, a phase detector for measuring the difference in phase between the variations of the signal picked up and the signal used to energize the recording head, and a recorder for recording the measured difference in phase variations whereby the speed of the rolls may be accurately measured.

5. Apparatus for recording the surface speed of a moving object of magnetic material comprising an oscillator for producing a constantly varying signal of constant frequency, a magnetic recorder head connected to the oscillator, a continuously advancing magnetic object moving past the recorder head, said recorder head being adapted when energized by the oscillator to magnetize a constantly varying signal of constant frequency on portions of the object, a magnetic pick-up head located in the path of the advancing article and recorded signal at a fixed and predetermined point beyond the recorder head to pick up the magnetic signal, a phase detector connected to the oscillator and to the pick-up head to measure the difference in phase between the variations of the signal produced by the oscillator and the signal picked up by the pick-up head.

6. The apparatus of claim 5 which additionally comprises a recorder for recording the difference in phase between the oscillator signal and the signal picked up.

7. The apparatus of claim 6 in which the recorder for recording the difference in phase is calibrated to speed to give a direct reading of the speed of the object.

8. In a paper making machine, a rotating element having a cylindrical paper-carrying surface composed of magnetic material, a magnetic recorder head adjacent said cylindrical surface for recording thereon a periodically varying magnetic signal of constant frequency, means for energizing said recording head with a periodically varying signal of constant frequency, a magnetic pick-up head located adjacent said paper-carrying surface at a point spaced at a fixed and predetermined distance from the point of recording to pick up the recorded signal, and a phase detector for measuring the difference in phase between the variations of the signal picked up by the pick-up head and the signal supplied to the recording head.

References Cited in the file of this patent

UNITED STATES PATENTS

| 2,378,388 | Bezum | June 19, 1945 |
| 2,656,419 | Dingley | Oct. 20, 1953 |